Sept. 13, 1932.  W. G. EXTON  1,877,501
ELECTROOPTICAL METHOD AND MEANS FOR MEASURING SUBSTANCES
FOR CONCENTRATIONS, COLORS, DISPERSIONS, ETC
Filed June 13, 1930
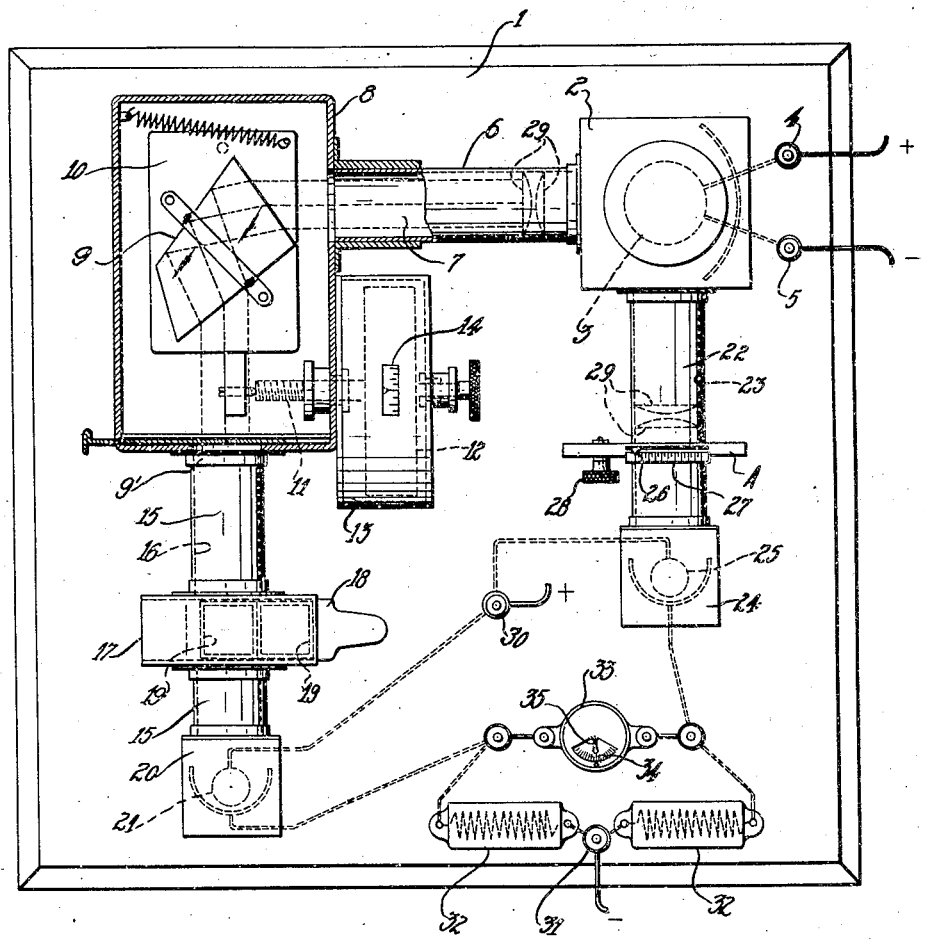
INVENTOR.
William G. Exton,
BY
George D. Richards
ATTORNEY.

Patented Sept. 13, 1932

1,877,501

UNITED STATES PATENT OFFICE

WILLIAM G. EXTON, OF NEW YORK, N. Y.

ELECTROOPTICAL METHOD AND MEANS FOR MEASURING SUBSTANCES FOR CONCENTRATIONS, COLORS, DISPERSIONS, ETC.

Application filed June 13, 1930. Serial No. 460,862.

This invention relates, generally, to a novel electro-optical method of measuring substances, and especially fluid substances, for concentrations, colors, dispersions and other characteristics, and to a novel apparatus by means of which said method may be practised.

In my co-pending application for United States Letters Patent Ser. No. 448,235, filed April 29, 1930, I have disclosed an electro-optical method and means for similar purposes, whereby a null measurement method is provided. In the method and means of the instant invention, the same are modified so as to measure radiant energy applied through the agency of a suitable color analyzer or spectrophotometer element. The instant method employs, however, the same null principle, i. e., the evoked currents from two light sensitive electric cells are balanced against one another, whereby current from one cell corresponds to and registers the light transmitted or reflected from the specimen under examination, and is balanced against the current from the other cell as stimulated by light from a common source, the effect being observable by means of suitable indicating instrument, such as a galvanometer or electrometer; adjustable means having an indicating scale being provided to balance the light to thus obtain measurement criteria.

It is therefore the principal object of this invention to provide an electro-optical method and means for obtaining measurement criteria based on transmitted light of selected wave-length.

Other objects of this invention, not at this time more particularly enumerated, will be understood from the following detailed construction of the same.

An illustrative embodiment of the present invention is shown in the accompanying drawing, which represents, in more or less diagrammatic form, a plan view of the novel instrument by means of which the novel method is practised.

Referring to said drawing, the reference character 1 indicates a suitable base on which is mounted a light source housing 2. Arranged within this housing 2 is an electric lamp 3, preferably of the incandescent type. Suitable electrical connections 4 and 5 are provided for including said lamp in circuit with a source of electric current, such as the usual commercial current distributing lines.

Communicating with said housing 2, at a point opposite the lamp 3, and extending onwardly therefrom, is a tubular member 6, the interior of which provides a light transmission passage 7 to be traversed by light emanating from said lamp 3. Mounted on said base 1, and connected to and communicating with the outer end of said tubular member 6 is a chambered casing 8 in which is mounted a spectrophotometric element, preferably in the form of a monochrometer of the type comprising a constant deviation prism or diffraction grating, as, for example, indicated at 9; the same being mounted for selective adjustment on a yieldably mounted platform 10 which is subject to adjustment by the adjusting screw shank 11 of a manipulatable wave length selector drum 12, having the usual apertured cover 13 through which its indicating scale 14 may be read.

The monochrometer may be of a much simpler type than is usually found in spectrophotometers, since, in the instrument of this invention, practically none of the usual telescopic optical devices and none of the devices for the provision of a visual comparison field are required, and are therefore eliminated. On this account, the path of light through the monochronometer is shortened, and the arrangement need consist only of means for setting the prism or grating 9 at a point corresponding to the wave length of the visual spectrum desired, usually comprising a screw 11 and a calibrated drum 12 and a suitable slitted slide or diaphragm, as 9', for excluding other light than that of the particular wave length selected.

The light receiving face of the monochrometer prism 9 is opposed to the light transmission passage 7 so as to receive light from the lamp 3 therethrough. Connected to and communicating with the casing 8, at a point opposed to the light transmitting face of the monochrometer prism 9, is a tubular member 15, the interior of which provides a light transmission passage 16 to pass light of selected wave length transmitted from the monochrometer prism 9. Connected with said tubular member 15 so as to intersect said passage 16 is means to hold the fluid or substance subjected to examination. This means is subject to considerable variation as to form. Illustrative of a convenient form thereof, I have shown the same to comprise a transverse receiving chamber or way 17, in which is slidably secured a removable and adjustable tray 18, on which may be carried one or more transparent cups 19 to contain fluids or substances to be submitted to the measurement method. Preferably two such cups are provided, one to receive a comparison specimen of known characteristics and the other to receive the specimen to be measured.

Mounted on said base 1, to communicate with the outer end of said tubular member 15, is a housing 20, and arranged therein, in exposure to light transmitted or reflected from the specimen exposed to light of selected wave length transmitted by the monochronometer prism 9, is a light sensitive electric device 21, such as a photoelectric cell, photovoltaic cell, or the like.

Communicating with another side of said housing 2, at a point opposite the lamp 3, and extending outwardly therefrom, is a tubular member 22, the interior of which provides a light transmission passage 23 also to be traversed by light emanating from said lamp 3.

Mounted on said base 1, to communicate with the outer end of said tubular member 22, is a housing 24, and arranged therein, in exposure to light emanating from the common lamp source 3, is a light sensitive electric device 25, such as a photoelectric cell, photovoltaic cell, or the like.

Connected with the tubular member 22, intermediate the housing 2 and light sensitive electric device 25, is a light adjusting means A. This means may consist of a suitable adjustable light modifying or controlling shutter, having an indicator point 26 to co-operate with a suitably calibrated scale 27, and a manipulatable means 28 for moving the shutter. Illustrative of a type of shutter mechanism suitable for the purpose reference may be had to that illustrated in my hereinbefore mentioned co-pending patent application, Ser. No. 448,235, filed April 29, 1930.

Suitable lenses, as 29 are preferably interposed between the light source and the monochromatic prism 9 and light adjusting means A respectively, for maintaining parallel the light rays emanating from the light source.

The electrical circuit serving the light sensitive electric cells includes an input connection 30 and an output connection 31. Between these connections is a Wheatstone bridge or balance, two arms of which extend respectively from the input connection 30 and respectively include the cells 21 and 25, and the other two arms of which respectively include suitable fixed resistances 32. Connected across the Wheatstone bridge or balance thus provided is a galvanometer 33 having a scale 34 provided with a center zero reading, and a movable needle or indicator arm 35 cooperating with said scale. If a more sensitive balance indicating device is desired, any suitable electrometer, for example, such as one of the Lindemann type, may be substituted in the balancing circuit of the cells in place of the galvanometer.

The method of making examination of a fluid desired to be measured is as follows:—

The unknown specimen is deposited in a cup 19, and, if desired, a comparison or known specimen is deposited in a second cup 19 on tray or slide 18, so that the respective cups and contents may be rapidly interchanged with respect to the light path 16. The known specimen may be measured and then the unknown specimen measured, and the results compared.

With a specimen aligned with the path of light through the passage 16, and with the monochrometer adjusted to transmit light of desired wave length, the desired light will be transmitted through the specimen to the light sensitive electric cell 21, thereby stimulating the latter to cause a fluctuation of the galvanometer needle 35, which would be deflected to one or the other side of the zero reading of the galvanometer scale. On this occurrence, the light adjusting means A, which controls admission of light to the balancing light sensitive cell 25, is adjusted or regulated to provide an aperture just sufficient to admit enough light to said cell 25 whereby the stimulation thereof produces output current corresponding to that of the cell 21 as stimulated by light transmitted through the specimen. The degree of adjustment of the means A is then read on its scale 27, and this procedure may be repeated by such settings of the wave length drum and prism of the spectrometer element as would be desired for the particular specimen under examination. By plotting the readings of the scale 27 against the wave length utilized, a spectrophotometric curve would be indicated which would provide a measure of radiant energy characteristics of the particular specimen examined.

With special illumination and quartz optical elements, the device is practical for operation and measurements in the ultraviolet region of the spectrum, and by similar additions could be made to give measurements in the infra red region of the spectrum also.

The extreme simplicity and rigidity of this arrangement are to be noted because of the fixed character of everything entering into the instrument, consequently, in the apparatus, the only variable is the specimen, since the light adjusting means A may be considered fixed when at the point of adjustment at which its aperture is just sufficient to admit enough light to the cell 25 to generate current in balance with that produced by cell 21. For these reasons the apparatus is more efficient, and much less expensive than other instruments usually employed in measurements of substances for concentrations, colors, dispersions, etc. Furthermore, the apparatus requires no batteries, amplifiers, potentiometers or other electrical accessories, nor does it require a multiplication of meters and adjusting devices usually found in instruments used for corresponding measurements.

As in the instrument disclosed in my aforesaid copending patent application, so here too any irregularities in the light source, due to current changes or lamp alteration are cancelled out, and consequently this apparatus also permits of the use of light sources derived from ordinary commercial current supply, while at the same time giving the user a wide choice as the particular type of lamp desired to be used.

As many changes could be made in the construction of the instrument and many widely different embodiments of this invention could be made without departing from the scope thereof, it is intended that all matter contained in the above description or shown in the accompanying drawing shall be interpreted as illustrative and not in a limiting sense.

I claim:

1. A method for measuring the relative ability of substances to transmit light of any selected wave length band, consisting of directing light from a source along two distinct paths, dispersing the light of the first of said paths, selecting a given wave length band of said dispersed light and passing said selected wave length band successively through substances to be compared while simultaneously varying the quantity of light passing along said second path so that the successive intensities thereof correspond to the successive intensities of the light passed through said substances, the successive variations in the quantity of light passing along said second path being used as a measure of the relative ability of the successively tested substances to transmit light of the selected wave length band.

2. A method for measuring the relative ability of differing substances to transmit light of varying wave lengths, consisting of directing light from a source along two distinct paths, dispersing the light of the first of said paths, selecting in succession a plurality of differing wave lengths of said dispersed light and passing each of said selected wave lengths successively through differing substances to be compared, while simultaneously varying the quantity of light passing along said second path so that the successive intensities thereof correspond to the successive intensities of the light passed through said substances, the successive variations in the quantity of light passing along said second path being used as a measure of the relative ability of the successively tested substances to transmit light of the several wave lengths.

3. A method for measuring the relative ability of differing substances to transmit light from a single source split up into any selected wave lengths, consisting of directing light from the source along two differing paths, dispersing the light of the first of said paths, selecting in succession desired wave lengths of said dispersed light and passing said desired wave lengths in succession through substances to be compared, while simultaneously varying the quantity of light passing along said second path so that the successive intensities thereof are equal to the successive intensities of the light passed through the said successively tested substances, the successive variations in the quantity of light passing along the said second path, while light of any one wave length is being passed through said substances successively, being used as a measure of the relative ability of the successively tested substances to transmit light of the particular wave length.

4. An apparatus for measuring the relative ability of substances to transmit light of selective wave lengths, comprising a light source, a pair of light sensitive cells, means for conveying light from said light source to said light sensitive cells, said conveying means providing two distinct light delivery paths leading from said light source, respectively, to each light cell, a dispersive member included in the first of said light delivery paths, said dispersive member being arranged so that any selected wave length may be caused to fall upon the respective cell associated with said first light delivery path, a station arranged to receive a deposit of substance to be examined included in said first light delivery path between said dispersive member and said cell, and adjustable means included in said second light delivery path for varying the quantity of light passing to the cell associated with said second light delivery path so that the light intensity falling on the two cells may be made equal, the successive variations in the adjustment of said light varying means being used to indicate the relative ability of the successive substances tested to transmit light.

5. An apparatus for measuring the relative ability of substances to transmit light of selective wave lengths, comprising a light source, a pair of light sensitive cells, means for conveying light from said light source to said light sensitive cells, said conveying means providing two distinct light delivery paths leading from said light source, respectively, to each light cell, a dispersive member included in the first of said light delivery paths, said dispersive member being arranged so that any selected wave length may be caused to fall upon the respective cell associated with said first light delivery path, a station arranged to receive a deposit of substance to be examined included in said first light delivery path between said dispersive member and said cell, adjustable means included in said second light delivery path for varying the quantity of light passing to the cell associated with said second light delivery path so that the light intensity falling on the two cells may be made equal, an electrical circuit interconnecting said light sensitive cells, and a current meter included in said circuit for determining when the light intensities received by said cells are equal, the successive variations in the adjustment of said light varying means being used to indicate the relative ability of the successive substances tested to transmit light.

In testimony, that I claim the invention set forth above I have hereunto set my hand this 9th day of June, 1930.

WILLIAM G. EXTON.